United States Patent [19]

Ouellette

[11] 4,178,482
[45] Dec. 11, 1979

[54] AUTOMATIC GAIN CONTROL CIRCUIT AND SYSTEM FOR USING SAME

[75] Inventor: Maurice J. Ouellette, North Berwick, Me.

[73] Assignee: General Electric Company, Somersworth, N.H.

[21] Appl. No.: 957,907

[22] Filed: Nov. 6, 1978

[51] Int. Cl.² .............................................. H04J 1/12
[52] U.S. Cl. ......................... 179/15 AN; 179/15 FD; 325/411; 330/284
[58] Field of Search ...................... 179/15 AN, 15 FD; 325/319, 411, 413; 330/185, 284; 340/182, 171 A

[56] References Cited

U.S. PATENT DOCUMENTS

| | | | |
|---|---|---|---|
| 2,662,933 | 12/1953 | Singer | 179/15 AN |
| 3,218,570 | 11/1965 | Godier | 330/185 |
| 3,581,210 | 5/1971 | Amfahr | 325/411 |

OTHER PUBLICATIONS

"An Integrated Circuit Speech Compressor" by Langton in Radio Communication, Aug. 1973, vol. 49, No. 8, pp. 544-555.

Primary Examiner—Douglas W. Olms
Attorney, Agent, or Firm—Robert E. Brunson; Francis X. Doyle

[57] ABSTRACT

An automatic gain control circuit and system for using same provides linear attenuation response to input data signals of multiplexed frequencies of high and low signal amplitudes to eliminate frequency intermodulation products generated by the data signals of high amplitude from interfering with the reception of the proper data signals by a tuned receiver communicating with the automatic gain control circuit.

10 Claims, 5 Drawing Figures

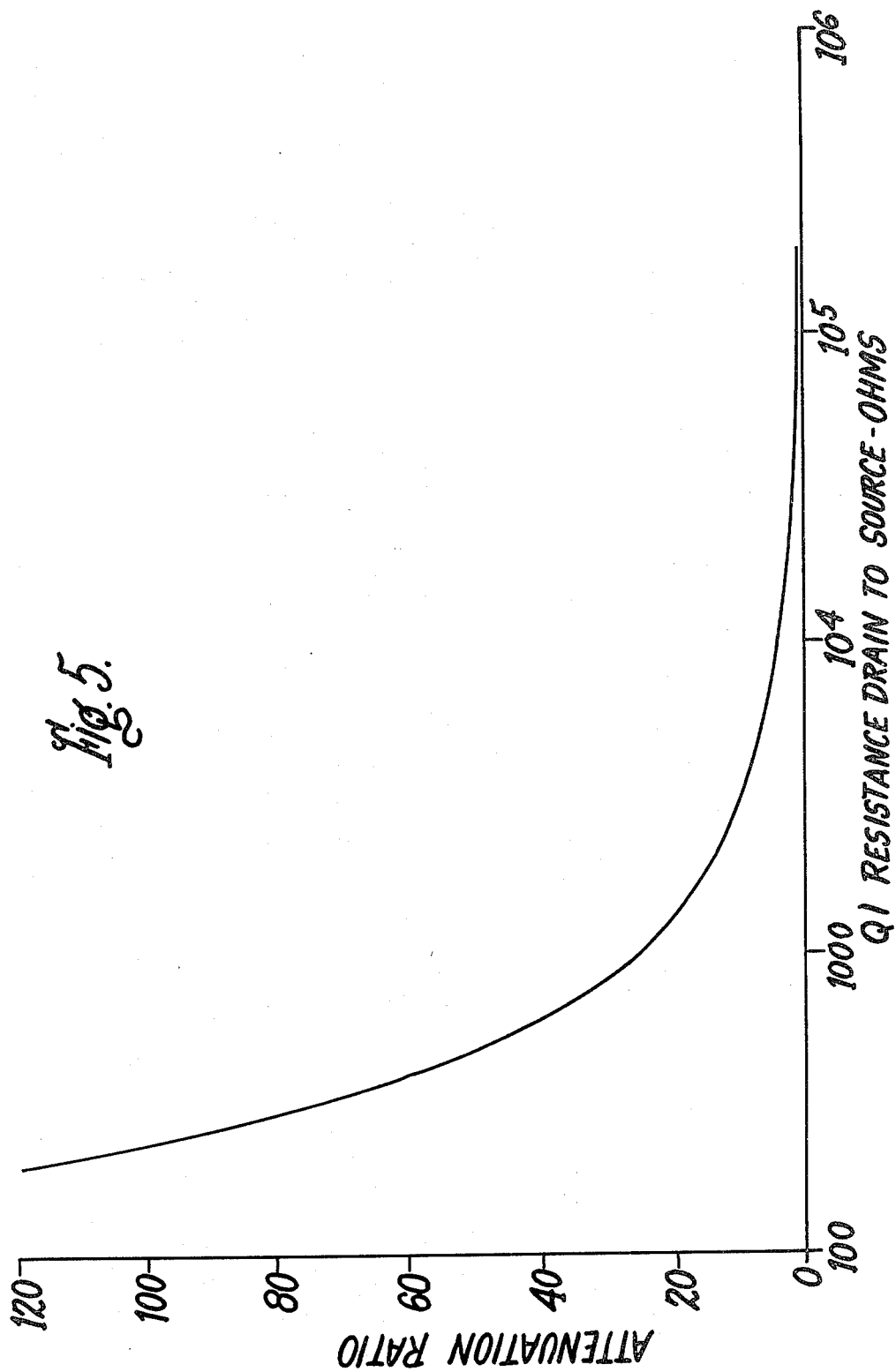

AUTOMATIC GAIN CONTROL CIRCUIT AND SYSTEM FOR USING SAME

BACKGROUND OF THE INVENTION

This invention relates generally to an automatic gain control circuit and a system for using such a circuit. More particularly the invention relates to communication systems of the type wherein the gain of data signals varying over a wide range of signal levels and having several frequencies present are controlled by an automatic gain control circuit to substantially eliminate frequency intermodulation products of the several frequencies from interfering with other ones of the frequencies to allow the data signals to be selectively received by receiver circuits which are each tuned to a specific frequency to receive the data signals at their respectively tuned frequency.

FIELD OF THE INVENTION

In certain types of data communication systems, it is sometimes expedient to transmit data signals from one or more signal sources wherein the data signals are comprised of frequency multiplexed data in the form of several simultaneously generated frequencies which may vary over a wide range of signal levels at the receivers receiving the data signals. In these types of systems, each of the frequencies comprises a data channel for carrying information to be received by an automatic gain control (AGC) circuit feeding a receiver tuned to the frequency of each data channel. Generally, a receiver tuned to a specific frequency has no trouble detecting and receiving data at its tuned frequency, if it is the only signal seen by the receiver. In frequency multiplexed communication systems however, wherein each of several receivers is tuned to a different frequency or channel, frequency intermodulation products of the frequencies of the several channels frequently interfer with the frequency of one or more other channels, hence resulting in the total loss of, or the reception of false data by those receivers corresponding to the channels in which the interference occurs.

It is well known in the art that frequency interference intermodulation of data signals between several frequency channels is caused, at least in part, from excessive amplitude modulation (i.e., signals of abnormally large amplitude) and the non-linear response characteristics of the signal receiving AGC circuits. These non-linear AGC circuits each feed a distorted signal to a corresponding receiver which can result in the reception of eroneous or unwanted data. The effects of this intermodulation and distortion at each receiver's AGC circuit, frequently causes one or more receivers to receive false data, which results from certain intermodulation products of high signal level and at a frequency(s) of a tuned receiver(s), which over-rides the signal level of the frequency of the data signals to which the one or more receivers is tuned.

Thus, a need exists for a new and improved automatic gain control circuit of economical design which can be used to linearly control the amplitude of the data signals presented to a receiver and which substantially eliminates the aforementioned frequency intermodulation products and distortion problems inherent in systems of the preceding type to ensure that the data intended for each receiver is accurately received.

DESCRIPTION OF THE PRIOR ART

Automatic gain control (AGC) circuits are well known in the art, and there are many designs of such circuits for use in various environments. In frequency multiplexed systems of the type contemplated by the present invention, these circuits, in the past, have been quite complex and expensive to manufacture. However, in recent years, with the advent of semiconductor field effect transistors (MOSFET), the complexity and cost of these types of circuits has been reduced by virtue of their use as linear voltage controlled resistors for reducing signal distortion at the input to the AGC circuits. Two such circuits are disclosed in a publication entitled FETs As Voltage-Controlled Resistors, published by Siliconix Incorporated, 2201 Laurelwood Road, Santa Clara, Calif., Copyright 1973.

In FIG. 10 of page 5 of the above mentioned publication, there is shown an electronic gain control circuit which utilizes a junction field effect transistor (JFET) in conjunction with a resistance feedback operational amplifier. In that circuit, the source and drain electrodes of the JFET are connected across the differential signal input terminals of the operational amplifier. The source electrode is connected to ground along with one input terminal of the amplifier and the input signal is provided to the other amplifier input terminal and to the drain electrode of the JFET via an input resistor. A control voltage $V_{gs}$ is applied to the gate electrode of the JFET to establish a bias therein which allows the JFET to operate in a linear resistance region with variations in the amplitude of the input signal to the amplifier to attenuate the input signal whereby the amplitude of the output signals of the amplifier are substantially constant.

While the above described AGC circuit of FIG. 10 of the Siliconix publication serves to operate linearly with input signals which vary over a modest amplitude range, it suffers from the constraint that large amplitude changes in the input signal create excessive drain current in the JFET which causes it to go into saturation, thus pulling it out of the linear resistance region and causing distortion of the input signal to the operational amplifier.

On page 6 of the aforementioned publication, FIG. 18 depicts another circuit using a JFET suitable for use with an operational amplifier as an AGC circuit. This circuit is similar to that just described for FIG. 10, except that the control voltage is applied to the gate electrode of the JFET via a gate input resistor. Also, a second resistor of equal value to the gate input resistor is connected across the drain and gate electrodes of the JFET to apply a part of the drain signal to the gate to effect a decreasing or increasing of the JFET depletion layer with positive and negative changes in the amplitude of the input signal. This changing of the depletion layer has the effect of increasing or decreasing the drain current with changes in the input signal level by controlling the draingate forward bias which, in turn, tends to linearize the resistance of the JFET over the amplitude range of the input signals.

This latter circuit has the capability of handling signals of a larger amplitude range than that described for FIG. 10 before distortion of the input signal occurs; however, it also suffers from not being able to handle extremely large signal variations. This is due to the fact that only a part of the input signal can be fed back from the drain to the gate of the JFET, thus signals of equal amplitude do not appear on the gate and drain electrodes. This results in the possibility that the FJET can be driven into saturation with extremely large input signals, causing excessive drain current to flow, and thus distorting the input signal. Another disadvantage of this circuit is that a certain amount of current from the gate control voltage of the JFET appears at the drain terminal via the drain to gate connected resistor. This current causes a certain amount of DC offset voltage to appear across the operational amplifier differential input terminals which is amplified causing an error in the output signals of the operational amplifier. Thus, in an AGC circuit of the type under discussion, it is desirable to completely isolate the signal input terminal of the operational amplifier from any influencing voltages, currents, or signals which may influence the amplifier to induce an error in the output signals thereof.

From the foregoing, it can now be seen that an AGC circuit, in order to be completely effective in a frequency multiplexed environment, where large changes in signal amplitude of different frequencies are present, must take into consideration in its design; (1) sufficient linear operation over the entire range of input signal levels, (2) the ability to linearly attenuate all input signals over the entire range to prevent distortion of the input signals and hence eliminate the generation of intermodulation products which can interfere with the valid reception of data by several receivers, and (3) completely isolate the signal input terminals of the operational amplifier from any error inducing voltages, currents or signals which would be amplified by the operational amplifier to cause an error in the reproduced input signal at the output of the amplifier. Additional considerations to also be taken into account are errors introduced by common mode voltage inputs to the operational amplifier and DC offset voltages in the amplifier, each of which can contribute to an overall non-linear operating AGC circuit.

SUMMARY OF THE INVENTION

The present invention overcomes the foregoing disadvantages by the provision of an automatic gain control circuit, and its use in a multi-channel frequency multiplex communication system, which operates over a wide signal level range of several simultaneously present frequencies to eliminate frequency interference modulation products between receiver channels of the system.

A signal attenuation means, in the form of a voltage controllable resistance element, in conjunction with an input signal bypass element for partially controlling the resistance element, functions to linearly attenuate the amplitude of the frequency multiplexed input signals to a feedback controlled operational amplifier, to prevent distortion of the input signals. The output of the amplifier is thus an undistorted linear amplified output signal having a minimum of intermodulation products suitable for reception by a receiver tuned to the frequency of a one of the multiplexed input signals.

Means are provided in conjunction with the controllable resistance element for reducing the common mode voltage seen by the differential input terminals of the operational amplifier. This is effectuated by varying the effective resistance of the resistance element with changes in the amplitude of the input signals, whereby a proportionate change occurs in the common mode inputs to the amplifier so that the common mode voltage difference always remains small. This latter means ensures that only the attenuated input signals are passed by the operational amplifier, thus contributing further to the accuracy and linearity of the automatic gain control circuit of the present invention.

In view of the foregoing, it is therefore a primary object of the invention to provide an economical design for an automatic gain control circuit having enhanced operating capabilities.

It is another object of the present invention to provide an automatic gain control circuit capable of receiving signals varying over a wide range in amplitude wherein the amplitude of those signals is linearly attenuated to eliminate distortion of the signals.

A still further object of the invention is to provide an automatic gain control circuit for use in a multi-channel frequency multiplex communication system capable of linearly attenuating input data signals of several channel frequencies which vary in amplitude over a wide range to attenuate the amplitude of the input data signals to eliminate inner channel frequency intermodulation products generated by the several channel frequencies, whereby each channel can accurately receive the input data signals designated for each of the several channels.

It is an other object of the present invention to provide an automatic gain control circuit incorporating an operational amplifier and a voltage controllable resistance element capable of linearly attenuating the amplitude of data input signals provided thereto and including means for minimizing the common-mode voltage seen by the inputs of the operational amplifier to provide the data input signals as undistorted data output signals from the operational amplifier.

Yet another object of the present invention is to provide an automatic gain control circuit incorporating a linearly operable voltage controllable resistance element for attenuating the amplitude of input signals provided to the circuit whereby the linearity of the resistance element is unaffected by the amplitude of the input signals.

BRIEF DESCRIPTION OF THE DRAWING

The preceding objects and other objects and advantages of the invention will be better appreciated by reading the following detailed description of the embodiments of the invention, particularly when considered with the accompanying drawing in which:

FIG. 5 is a plot illustrating the circuit attenuation ratio of the automatic gain control circuit of FIG. 2 as a function of the resistance of the voltage controllable resistance element of that circuit.

DESCRIPTION OF THE PREFERRED EMBODIMENT

Prior to describing the embodiments of FIGS. 1-4, it is first considered advantageous to briefly describe how the aforementioned frequency intermodulation products are generated in a frequency multiplex system. To understand the generation of these products, it is first necessary to assume a data communication link wherein several closely separated frequencies (eg. frequencies f0, f1, f2) are simultaneously transmitted over the communication link. It should also be assumed that at least two of these frequencies will be very high in signal amplitude compared to at least one other frequency of much smaller amplitude. Additionally, assume that the several frequencies each represent a separate data channel containing information to be simultaneously received by separate receivers tuned to receive data at their corresponding channel frequencies.

It is well known in the art that when a complex wave comprised of several separate frequencies (ie. f0, f1, f2) are presented to the input of a non-linear device, that the sum of two of these frequencies can generate other frequencies. This can be explained by plotting $e_{in}$ (as the sum of two or more frequencies or waves) as the input to a non-linear device against $e_{out}$ (the output of the non-linear device.) This plot will yield the following polynomial of a non-linear curve:

$$e_{out} = a_1 + a_1 e_{in} + a_2 e_{in}^2 + a_3 + e_{in}^3 + \ldots$$

Where $a = A$ constant, such as amplifier gain. Thus, it can be seen that the sum of two or more frequencies combine to generate an ascending order of product frequencies which may be the same as one or more other frequencies which are adjacent to the combined frequencies. In practice, these intermodulation frequency signals are the same as certain other frequencies being transmitted, and they can be greater in signal amplitude than those certain other frequencies. In a frequency multiplex communication system, where the several frequencies each represent data, the intermodulation frequencies, because of their high signal amplitude, frequently cause a receiver tuned to a specific frequency to receive false data because of the over-riding amplitude effects of an intermodulation frequency of the same frequency to which the receiver is tuned. As mentioned above, these intermodulation products or frequencies are due to the non-linear response of the device receiving the several multiplexed frequencies or signals. It is this non-linearity which must be eliminated in order to minimize the over-riding reception effects that the intermodulation products or frequencies have on receivers in a communication system of the type contemplated by the invention.

Figure 1:
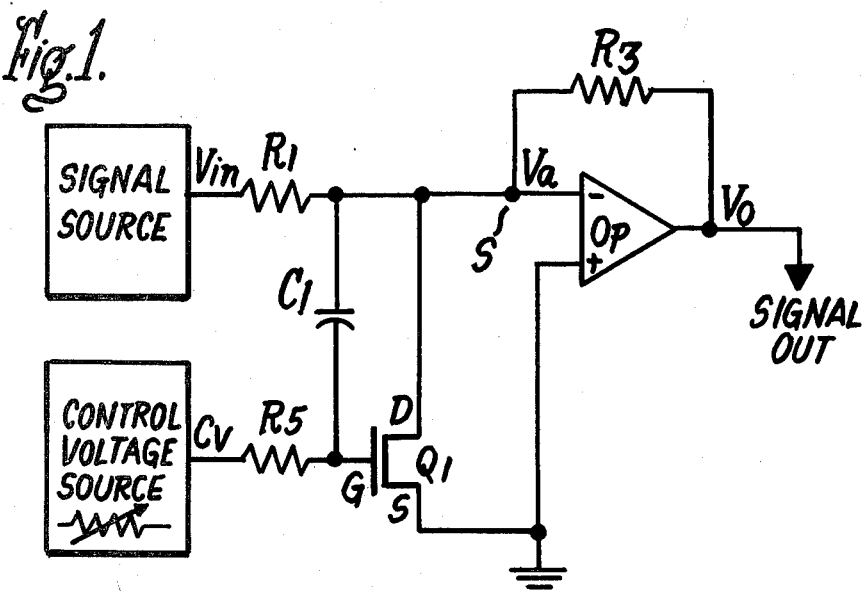
FIG. 1 is a schematic diagram of one embodiment of the automatic gain control circuit of the present invention.

With the foregoing description in mind, reference is now made to FIG. 1, which illustrates an automatic gain control (AGC) circuit in accordance with one embodiment of the invention. A signal source is shown for generating input or data signals Vin as one input Va to a negative (−) or inverting input terminal of a conventional operational (OP) amplifier via a resistor R1.

A control voltage source, illustrated as being variable or adjustable provides a control voltage $C_v$ of a prescribed magnitude to a gate (G) terminal of an N-channel insulated gate field effect transistor (IGFET) Q1 via a resistor R5. The IGFET Q1 is a commercially available voltage controllable resistance element, the type used in the illustrated embodiment being an industry standard type 3N138.

The input data signals (Vin) are applied to the control or gate (G) input of the resistance element Q1 via a signal by-pass element shown as a capacitor C1. The purpose of C1 will subsequently be described. As shown in FIG. 1, the resistance element Q1 includes drain (D) and source (S) terminals or electrodes. The drain of Q1 is connected to the (−) input of the OP amplifier at a summing (S) point. The S or source of Q1 is connected to a common potential, illustrated as ground, in conjunction with a positive (+) or non-inverting input of the OP amplifier. The OP amplifier is connected in feedback configuration via a resistor R3 which operates in conjunction with R1 to control the overall gain of the amplifier.

To understand the operation of the AGC circuit of FIG. 1, it must first be understood that the input signal (Vin) to that circuit is a complex wave form of several discrete frequencies of which the signal amplitude of at least two frequencies are much greater than the other frequencies. The control voltage $C_v$ from the voltage source is preset to some predetermined magnitude which sets the resistance of Q1 at some predetermined value so that it is biased in a linear resistance region to control the magnitude of the input signals Va substantially constant with changes in the amplitude of Vin.

Assume now that the above described input signals Vin are being applied to the resistor R1. These signals are by-passed to the G input of Q1 via C1 while they are simultaneously applied to the D terminal of Q1. The data signals appearing at the G and and D terminals of Q1 are in phase and they have a cancellation effect across the G to D region of Q1 to effectively allow a DC bias to appear across the G and D terminals as controlled solely by the control voltage $C_v$. It should be noted that the resistor R5 serves to isolate the voltage source from the data signals applied to the gate of Q1, so that those signals do not affect the $C_v$ output of the control voltage source.

It can now be seen, that as the amplitude of the input data signals Vin vary over a wide range in amplitude, that those signals, will be attenuated to some constant amplitude at Va as determined by the resistance of Q1 which is set by the control voltage $C_v$. The output Vo of the OP amplifier is basically a reproduction of the Vin data signals, but linearly attenuated at the (−) input of the amplifier by Q1 to provide output signals of substantially constant amplitude.

Figure 2:
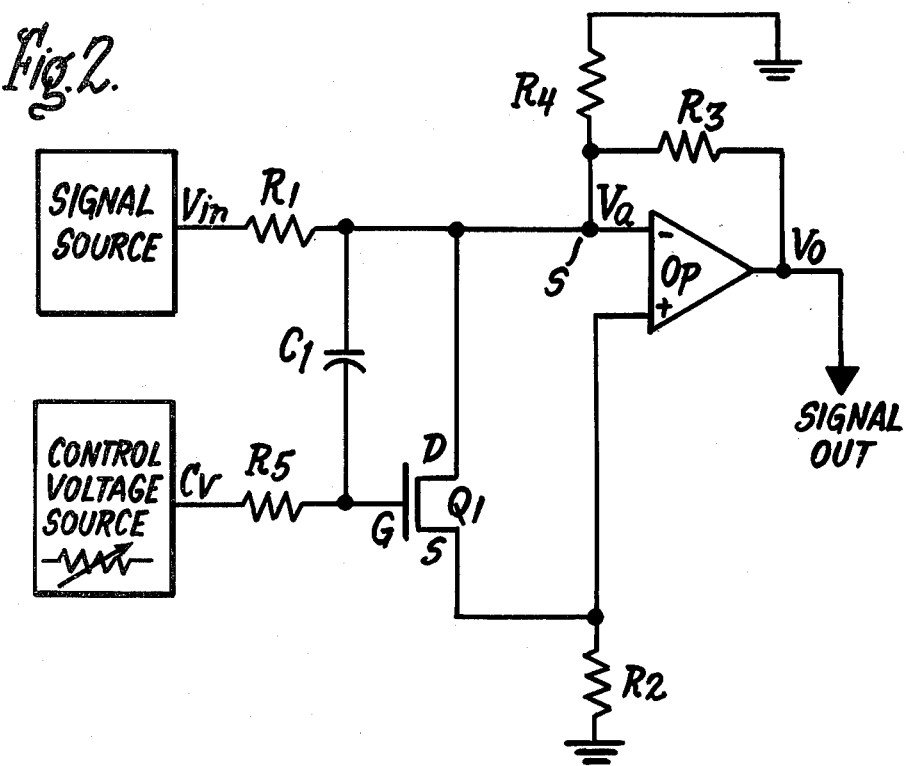
FIG. 2 is a schematic diagram of a second embodiment of the automatic gain control circuit of the present invention.

Reference is now made to FIG. 2 which illustrates a preferred embodiment of the invention. As can be seen, FIG. 2 is similar to FIG. 1, but it includes additional resistors R2 and R4. In this latter embodiment, R2 is connected at one end to the common potential (ground) and at the other end to the S terminal of Q1 and the (+) input terminal of the OP amplifier. The AGC circuit of FIG. 2 posseses better linear attenuation of the input signals Vin over a much broader range in amplitude than the embodiment of FIG. 1. The FIG. 2 embodiment also eliminates or substantially minimizes the aforementioned common mode voltage seen at the ± input terminals of the OP amplifier.

As an aid to an understanding of the operation of FIG. 2, the following observations and description is given:

Let X = The resistance of the voltage controllable variable resistance element Q1 at some value of the control voltage $C_v$. $C_v$ can be a DC voltage which varies in magnitude according to the the amplitude of Vo and may be provided from a conventional receiver circuit as an AGC feedback voltage as shown by an fo receiver of FIG. 3 providing a control voltage Cvo to the G input of FIG. 1 or 2.

Let G=The gain of the OP amplifier in a dynamic mode of operation at the signal frequency of the input signals Vin.

Then:

$$Vo = -GVa(X)/(X+R_2) \quad \text{Eq. (1)}$$

The − sign results from the signal inversion characteristics of the OP amplifier.

When the currents at the mode or summing point S are summed, then:

$$\frac{Vin - Va}{R1} = \frac{Va}{R4} + \frac{Va}{X + R2} + \frac{Va - Vo}{R3} + IC \quad \text{Eq. (2)}$$

Where Va is the amplitude of the input data signals at the − input of the OP amplifier and IC is the magnitude of the AC signal (input data signals) coupled through C1 to the gate (G) of Q1. IC is made very small because, as will subsequently be seen, R5>>R4. Since IC is small it can be ignored in the following description.

Now substituting equation (1) into equation (2) and solving for Vo (the output data signals of the OP amplifier) the following is seen:

$$Vo = \frac{-Vin}{R1 \left[ \frac{1}{R3} + \frac{1}{GX} + \frac{X+R2}{GX} + \left( \frac{1}{R4} + \frac{1}{R3} + \frac{1}{R1} \right) \right]} \quad \text{Eq. (3)}$$

The voltage Va at point S in terms of the output Vo is expressed by re-arranging equation (1) to get the following:

$$Va = \frac{-Vo}{G} \left( \frac{X + R2}{X} \right) \quad \text{Eq. (4)}$$

Finally, the drain (D) to source (S) voltage Vds across Q1 is expressed as:

$$Vds = \frac{-Vo}{G}$$

With the preceding definitions, the following observations on the operation of the embodiment of FIG. 2 can now be given:

(a) The values of C1 and R5 are chosen to closely AC couple the input data signals applied to the drain (D) of Q1 at S to the gate (G) of Q1 while maintaining a DC level or bias on Q1 as solely controlled and defined by the magnitude of the control voltage Cv (ie. the AC signal Va applied to the G and D terminals of Q1 cancel out any AC bias across Q1). This DC bias makes Vgs (the gate to source voltage of Q1) constant, rather than having Vgs vary as a function of the amplitude of Va, the input data signals.

(b) Observing now for the circuit condition when Q1 is turned off, then (X>>R2) and with a large value of G (gain) from equation (3) then:

$$Vo \simeq \frac{-Vin}{R1 \left[ \frac{1}{R3} + \frac{1}{GX} + \frac{1}{G} \left( \frac{1}{R4} + \frac{1}{R3} + \frac{1}{R1} \right) \right]} \quad \text{Eq. (6)}$$

Which is:

$$\simeq (-Vin\, R3/R1) \quad \text{Eq. (7)}$$

The familiar inverting operational amplifier gain equation.

(c) Referring now back to equation (3), the large term in brackets can be thought of as an equivalent R3 which is varied by the control voltage (Cv) controlling the resistance of Q1. Gain (G) is inversely proportional to this term, therefore attenuation (a) of the input signals at S is directly proportional to (:) that term as follows:

$$a \left[ \frac{1}{R3} + \frac{1}{GX} + \frac{X + R2}{GX} \left( \frac{1}{R4} + \frac{1}{R3} + \frac{1}{R1} \right) \right] \quad \text{Eq. (8)}$$

Thus, it can be seen that attenuation (a) is a ratio of Vin to Vo.

(d) Assume now, the following values for the embodiment of FIG. 2:
R1=R3=3.3K
R2=100k
R4=680 ohms
R5=120k
C1=0.01 ufd
G=30 at signal frequency Now substituting into equation (8) and plotting the results yields the plot of FIG. 5. FIG. 5 shows the circuit attenuation ratio (a) as a function of the resistance of Q1.

R4 is important in the operation of the invention of FIG. 2 in minimizing the voltage Va, and thus the common mode voltage seen by the ± input terminals of the OP amplifier:

(e) Now substituting equation (1) into equation (2) and solving for Va in terms of Vin:

$$Va = F(Vin) \quad \text{Eq. (9)}$$

Where F is a function of Vin

Now for small values of X (resistance of Q1) equation (9) reduces to:

$$Va = \frac{Vin}{R1 \left( \frac{1}{R1} + \frac{1}{R2} + \frac{1}{R3} + \frac{1}{R4} \right)}$$

Where Va is dominated by the smallest resistor R4.

Thus, the magnitude of Va is held small by R4 to yield:

$$Va \simeq (Vin\, R4/R1) \quad \text{Eq. (11)}$$

Now for large values of X, equation (9) reduces to:

$$Va = \frac{Vin}{R1 \left( \frac{1}{R1} + \frac{1}{R3} + \frac{1}{R4} + \frac{G}{R3} \right)} \quad \text{Eq. (12)}$$

The (G/R3) term dominates, so that $$Va \simeq (Vin\, R3/R_1 G) \quad \text{Eq. (13)}$$

In this latter case, Va is small even withour R4.

With the foregoing observations and descriptions in mind, the operation of the embodiment of FIG. 2 can now be thoroughly understood. In the ensuing description, reference is also made to FIG. 3 which illustrates a common signal source for generating a plurality of frequencies $f_o-f_n$ wherein each frequency represents a data channel for providing information to a corresponding number of tuned $f_o-f_n$ receivers, In FIG. 3 the $V_{in}$ signal applied to the AGC circuit is also illustrated as coming into a block representing the circuit of either FIG. 1 or FIG. 2. The $f_o-f_n$ data signals are provided over a common communication bus to each of the several AGC circuits which in turn provide input signals $f_o'-f_n'$ to their correspondingly tuned receivers. The $f_o-f_n$ receivers are conventional tuned rf receivers with each receiver providing a DC feedback control voltage such as $C_{vo}-C_{vn}$ which varies in magnitude according to the amplitude of the input signals detected by the respective receivers.

Each of the AGC circuits and their corresponding receivers operate in the same manner, therefore only the operation of the $f_o$ receiver and its AGC circuit will be described. The $f_o$ receiver is tuned to receive a frequency of $f_o'$ and the amplitude of that signal will generate a DC feedback signal $C_{vo}$, which is provided back to the G input of Q1 via resistor R5 as shown in FIG. 2. It is to be understood in the operation of the present invention that the feedback signal (ie. $C_{vo}-C_{vn}$) is a DC signal which varies slowly over a long period of time to provide a substantially constant DC signal level at the G input of Q1. The AGC circuit of the present invention is not designed to handle spurious high amplitude input signals applied to the input terminal of the operational amplifier, but rather it is designed to receive a plurality of input signals (that is several frequencies of different signal levels) wherein the amplitude of at least two of the frequency signals of data channels are always substantially greater than the other channel frequencies. The $f_o$ receiver, as are all of the other receivers, is designed such that when it detects its respective input frequency $f_o$ it will rapidly stabilize to provide a relatively constant $C_{vo}$ output back to the G input terminal of Q1 of its respective AGC circuit to thus establish the DC bias for Q1 and thus the resistance across Q1. The amplitude of the feedback signal $C_{vo}$ will thus control the resistance of Q1 causing it to operate in its linear resistance region.

Figure 3:
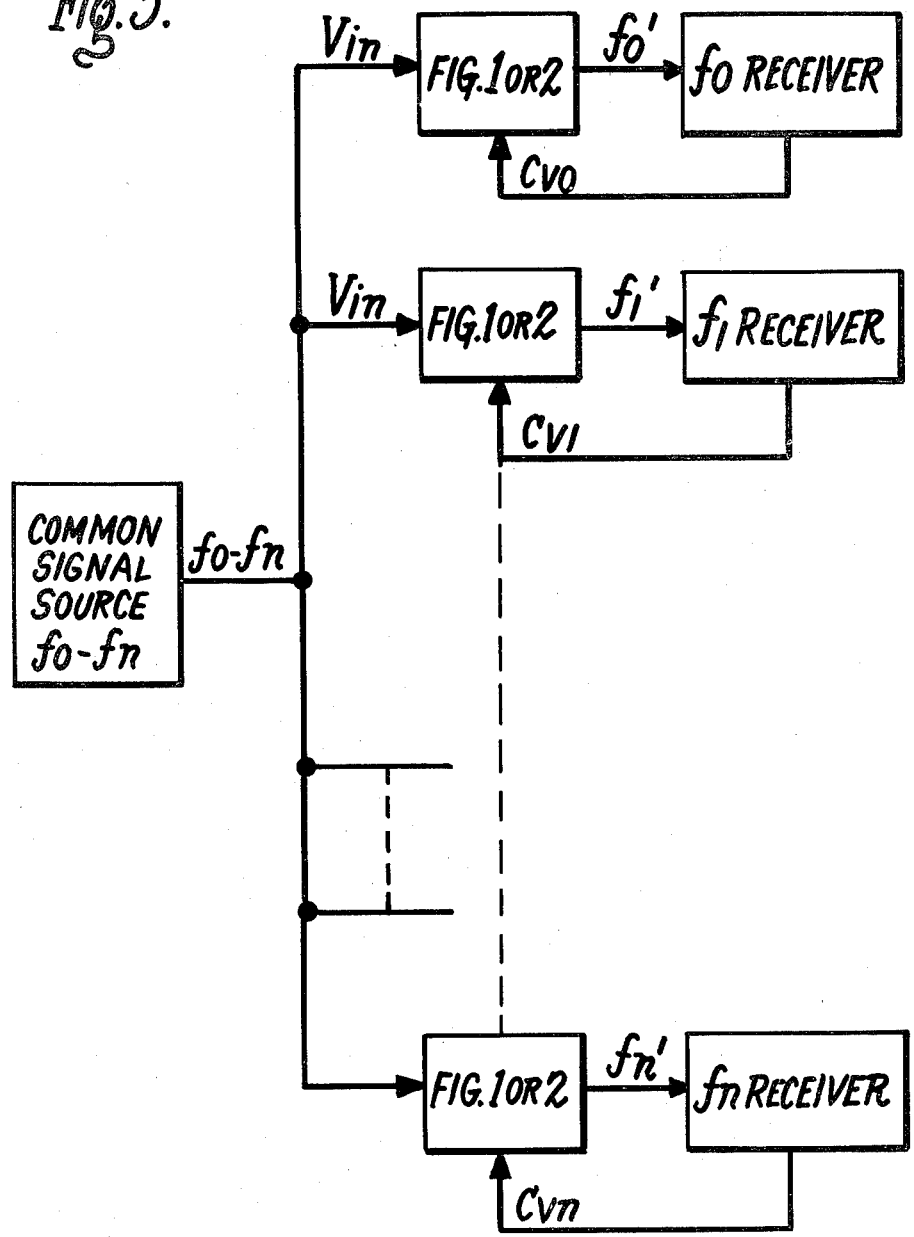
FIGS. 3 and 4 are other embodiments of the invention illustrating, in block diagram schematic form, the automatic gain control circuit of either FIG. 1 or FIG. 2 as used in a frequency multiplex communication system.

Let it now be assumed that the input signals $f_o-f_n$ are applied as $V_{in}$ to each of the AGC circuits as shown in FIG. 2 and FIG. 3. Let it also be assumed that the input signal $V_{in}$ is a complex wave, as previously described, wherein the amplitude of at least two of the frequencies $f_o-f_n$ are much greater than the other frequencies. When $V_{in}$ is first applied to the OP amplifier its output signal $V_o$ will rapidly reproduce that input signal and apply it to its corresponding receiver such as receiver $f_o$ in FIG. 3. Receiver $f_o$ in recognizing its tuned frequency, $f_o'$, will rapidly generate a high magnitude feedback signal $C_{vo}$ which is applied to the gate terminal of Q1 causing Q1 to turn on decreasing its resistance. Under this signal condition, the signal Va takes on the characteristic as previously described in equation 4, wherein the amplitude of Va is dominated by the smallest resistor R4 to thus hold the magnitude of Va small to yield the value of Va as shown in equation 11. Thus, it can be seen that the output $V_o$ of the OP amplifier rapidly decreases to a relatively constant amplitude in view of the attenuation of the input signals $v_{in}$. The output signals $V_o$, shown as $f_o'-f_n'$ in FIG. 3, are thus presented to the respective receivers $f_o-f_n$. It should be noted that the output signals $f_o'-f_n'$ now are relatively constant in magnitude and do not contain any intermodulation products of those frequencies which were present in the input to the AGC circuit of FIG. 2. Because of the attenuation of the data signals Vin, the intermodulation product frequencies are removed and thus do not appear as input signals at the respective receiver inputs. Each receiver can now accurately detect its turned frequency in view of the fact that only those frequencies $f_o'-f_n'$ are present at the input of each of the respective receivers as originally transmitted by the common signal source.

Referring back to FIG. 2, and as previously described, data signals $f_o-f_n$ are AC coupled through C1 to the gate (G) terminal of Q1 to effect a cancellation of the AC bias across the gate to drain electrodes of Q1, thus allowing the resistance of Q1 to be controlled solely by the control voltage Cv (Cvo–Cvn). It can thus be seen that the coupling capacitor, or bypass means C1, plays a significant part in the operation of the invention in that it prevents the resistance of Q1 from varying with changes in the amplitude of the data signals $V_{in}$. Because of this coupling or cancellation action of C1, the amplitude of the data signals $f_o-f_n$ can vary over an extremely wide range and thus have no affect of the operational resistance characteristics of Q1. In this manner, Q1 can be accurately regulated to operate in a linear resistance region by the magnitude of the feedback voltage Cv (Cvo–Cvn). As a result of the linear resistance operating characteristics of Q1, the amplitude of the data signals Vin at Va is accurately controlled by the attenuation of those signals to a constant level whereby all intermodulation products which would normally be generated in a non-linear AGC circuit are eliminated. Thus the output signals Vo ($f_o'-f_n'$) provided to the respective $f_o-f_n$ receivers are substantially devoid of any intermodulation products of the frequencies $f_o-f_n$ so that each of the receivers accurately receives the data at their tuned frequencies.

Let it now be assumed that the input signals $V_{in}$ ($f_o-f_n$) being applied to the AGC circuit of FIG. 2 are relatively small in amplitude. This effects a control voltage feedback signal Cv (Cvo–Cvn) from the respective receivers back to the gate input of Q1 of each of the AGC circuits to cause Q1 to thus basically turn off and increase its drain to source resistance. The amplitude of Va in this particular instance, now takes on the characteristics as previously described for equation 12, whereby the ratio of the gain over resistance R3 dominates the amplitude of Va where Va is approximately equal to Vin R3/R₁G as shown in equation 13. Thus it can be seen that the value of Vo is held at a relatively constant value regardless of the amplitude of the data signals Vin to linearly attenuate those signals and remove the aforementioned intermodulation products.

In the embodiment of FIG. 3, the common signal source may be a single transmitter or a plurality of transmitters located at a prescribed point on the communication link or bus and generating the output data channel signals $f_o-f_n$ to each of the various AGC circuits designated in blocks as FIG. 1 or FIG. 2. In this particular embodiment, the AGC and receiver circuits are dispersed along the common bus, some adjacent to the common signal source, and others at considerable distance from the signal source. Also, the amplitude of the $f_o-f_n$ signals may or may not be equal in magnitude. In any event, however, because of the communication link impedance, those AGC circuits which are located close to the common signal source will receive input data signals of extremely high magnitude and those AGC circuits which are a long distance away from the common signal source will receive signals of a much smaller magnitude. The circuit of the present invention becomes significant, as can be understood from the previous description, by realizing that the intermodulation products generated by those signals of high magnitude applied to the AGC circuits adjacent the common signal source can cause each of those AGC circuit's corresponding receivers to receive false data when those intermodulation products are of the same frequency to which a receiver is tuned. Thus it can be seen that the linear characteristics of the invention are of significant value in attenuating the amplitude of those high level signals, which are generally caused by over modulation, from getting through the AGC circuit and affecting the operation of each circuit's respective receiver.

Figure 4:
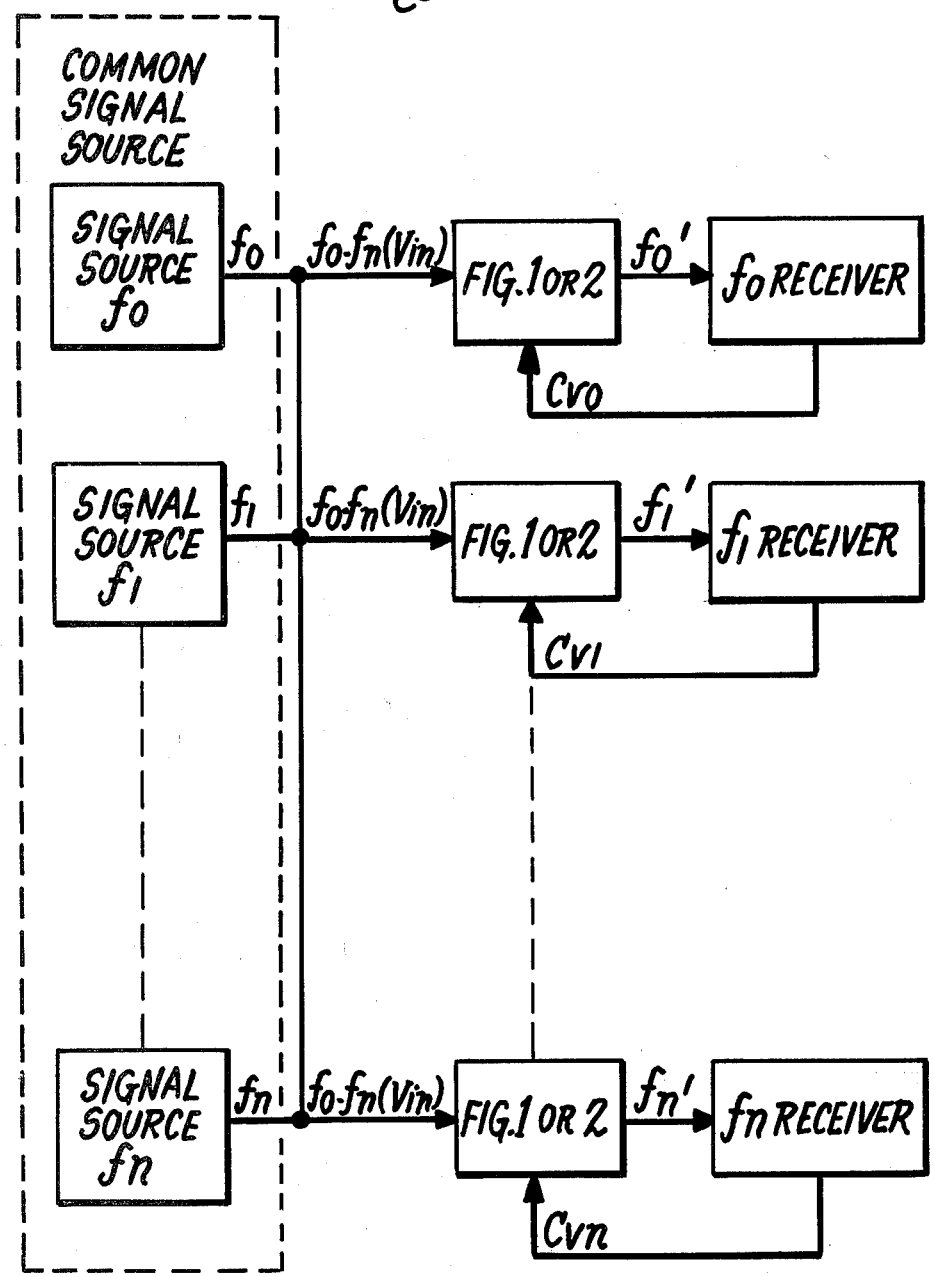

Reference is now made to FIG. 4, which is somewhat similar to FIG. 3 in that it shows a common signal source, however, with a plurality of signal sources designated $f_o$-$f_n$ for transmitting the $f_o$-$f_n$ data signals over the common bus as $V_{in}$ to each of several AGC circuits shown in blocks as FIG. 1 or FIG. 2. In this embodiment it is assumed that each of the AGC circuits and the $f_o$-$f_n$ receivers are located at a common point on the distribution bus and that the several signal sources $f_o$-$f_n$ are scattered over a long distance along the bus. As can be seen in this particular instance, assuming that each signal source $f_o$-$f_n$ generates a respective output signal at the same power level, some of those signals will appear of much greater amplitude at the AGC circuits than will other signals due to the line attenuation. In this embodiment, the data signals of large amplitude, which can cause the generation of intermodulation products at the input of the AGC circuit, are attenuated in the same manner as described in FIG. 3.

The present invention can find use in any type of multiplex data communication system wherein the possibility of intermodulation products can be generated such as in, rf communication systems, hard line radio, communication systems, telephone communication systems, or power line communication systems, such as that described in U.S. Pat. No. 4,107,656 assigned to the assignee of the present invention.

While the apparatus of this invention has been described in connection with the presently preferred embodiments, it shoud be obvious that modifications to the particularly disclosed embodiments are possible for one skilled in the art without departing from the true spirit and scope of the invention.

What is claimed is:

1. An automatic gain control circuit for substantially eliminating intermodulation frequency products from input signals applied thereto having several frequencies of which the magnitude of at least two frequencies are greater than the magnitude of the other frequencies comprising:

(a) a signal source for providing said input signals;
   (b) a source of reference potential;
   (c) a feedback gain controlled operational amplifier having a first input terminal connected to receive said input signals from said signal source, a second input terminal connected to said source of reference potential and an output terminal for providing output signals;
   (d) a voltage source for generating a control voltage of a prescribed magnitude;
   (e) a voltage controllable resistance element having a linear resistance characteristic connected across the first and second input terminals of said operational amplifier and having an input connected to receive said control voltage to establish therein a resistance of a prescribed value; and
   (f) a signal bypass element for coupling at least a portion of the input signals to the input of said resistance element to prevent changes in the resistance of said resistance element with changes in the amplitude of said input signals while the resistance of said resistance element is held substantially constant as controlled by said control voltage to effect an attenuation in the magnitude of the input signals applied to the first input terminal of said operational amplifier whereby the output signals from said operational amplifier are maintained at a substantially constant magnitude, as controlled by the linear resistance of said resistance element, with changes in the amplitude of said input signals.

2. The automatic gain control circuit in accordance with claim 1 wherein said resistance element comprises a field effect transistor having a drain electrode connected to the first input of said operational amplifier, a source electrode connected to said source of reference potential and a gate electrode as its input receiving said control voltage.

3. The automatic gain control element in accordance with claim 1 wherein said signal by-pass element comprises a capacitor.

4. The automatic gain control circuit in accordance with claim 1 wherein said voltage source includes means for adjusting the magnitude of said control voltage to control the resistance of said resistance element to thereby provide a prescribed attenuation in the magnitude of the input signals applied to the first input terminal of said operational amplifier.

5. The automatic gain control circuit in accordance with claim 1 wherein the circuit further includes a first resistor connected between said source of reference potential and said first input terminal of said operational amplifier and a second resistor connected between said source of reference potential and said second input terminal of said operational amplifier, whereby the ratio of the resistances of said first and second resistors and said resistance element serve to minimize any common mode error voltage present at said first and second input terminals of said operational amplifier to thereby substantially eliminate the amplification of any such common mode error voltage by said operational amplifier.

6. The automatic gain control circuit in accordance with claim 5 wherein the circuit further includes a third resistor connected at one end to receive said input signals and connected at the other end to said first input terminal of said operational amplifier, and a fourth resistor connected at one end to receive said control voltage and connected at the other end to the input of said resistance element whereby said input signals are passed through said third resistor to said signal bypass element for coupling the input signals directly to the input of said resistance element, with said fourth resistor serving to isolate the signals coupled through said signal bypass element from the output of said voltage source.

7. An automatic gain control circuit for substantially eliminating intermodulation frequency products from input signals applied thereto having several frequencies of which the magnitude of at least two frequencies are greater than the magnitude of the other frequencies comprising:

(a) a signal source for providing said input signals;
(b) a source of reference potential;
(c) a feedback gain controlled operational amplifier having first and second input terminals and an output terminal for providing output signals;
(d) a voltage source for generating a control voltage of a described magnitude;
(e) a voltage controllable resistance element having a linear resistance characteristic connected across the first and second input terminals of said operational amplifier, said resistance element having an input terminal;
(f) a first resistor connected between said voltage source and the input terminal of said resistance element for coupling said control voltage to said resistance element to establish therein a resistance of a prescribed value;
(g) a second resistor connected between said signal source and the first input terminal of said operational amplifier for coupling said input signals thereto;
(h) a third resistor connected between the first input terminal of said operational amplifier and said source of reference potential;
(i) a fourth resistor connected between the second input terminal of said operational amplifier and said source of reference potential; and
(j) a capacitor connected between the first input terminal of said operational amplifier and the input terminal of said resistance element for coupling at least a portion of said input signals to the input terminal of said resistance element to prevent changes in the resistance of said resistance element with changes in the amplitude of said input signals while the resistance of said resistance element is held substantially constant as controlled by said control voltage to effect an attenuation in the magnitude of the input signals applied to the first input terminal of said operational amplifier whereby the output signals from said operational amplifier are maintained at a substantially constant magnitude, as controlled by the linear resistance characteristic of said resistance element, with changes in the amplitude of said input signals.

8. In a communication system of the type wherein data signals are frequency multiplexed as a plurality of discrete frequencies, with each frequency representing a channel for carrying data to be received, apparatus for substantially eliminating frequency intermodulation products in at least two channels from interfering with the frequency of another channel to ensure the reception of data signals by each of the channels comprising:

(a) a signal source for generating said data signals;
(b) a plurality of receiver circuits, each tuned to a different frequency coresponding to a one of said channels for receiving input signals corresponding to said data signals, and each capable of generating an output control signal having a magnitude which varies in accordance with the magnitude of the input signals correspondingly received thereby;
(c) a plurality of automatic gain control circuits in communication with said signal source and receiving therefrom said data signals, said automatic gain control circuits each communicating with a corresponding one of said receiver circuits for providing input signals thereto in response to said data signals, each of said automatic gain control circuits including, (1) a feedback gain controlled operational amplifier having first and second input terminals and an output terminal for providing input signals to a corresponding receiver circuit;
(2) a voltage controllable resistance element having a linear resistance characteristic connected across the first and second input terminals of said operational amplifier and having an input terminal for receiving the output control signal from a corresponding receiver circuit for controlling the resistance thereof; and
(3) a signal bypass element for coupling at least a portion of the data signals to the input terminal of said resistance element to prevent changes in the resistance of said resistance element with changes in the amplitude of said data signals while the resistance of said resistance element is solely controlled by the output control voltage applied to the input terminal thereof to effect a linear attenuation in the amplitude of the data signals applied to the first input terminal of said operational amplifier to maintain the amplitude of the input signals to a corresponding receiver circuit substantially constant, to thereby substantially eliminate the frequency intermodulation products generated by the frequencies of at least two channels from interfering with the frequency of the data signals being received by all channels, whereby each automatic gain control circuit's corresponding receiver circuit receives only those input signals at the frequency to which it is tuned.

9. In a communication system of the type wherein data signals are frequency multiplexed over a common communication link as a plurality of discrete frequencies, with each frequency representing a channel for carrying data to be received, apparatus for substantially eliminating frequency intermodulation products in at least two channels from interfering with the frequency of another channel, to ensure the reception of data signals by each of the channels comprising:

(a) a plurality of signal sources located at prescribed intervals along said communication link, each simultaneously transmitting data signals over said communication link at a different channel frequency;
(b) a plurality of receiver circuits equal in number to said signal sources located at a central point on said communication link, each tuned to a different frequency for receiving input signals corresponding to a one of the channel frequencies, and each receiver circuit generating an output control signal having a magnitude which varies in accordance with the magnitude of the input signals correspondingly received thereby; and
(c) a plurality of automatic gain control circuits equal in number to said receiver circuits located at said central point and receiving, over said communication link, said data signals whereby the amplitudes of at least two of the data signals received are much greater than the amplitudes of the other data signals, said automatic gain control circuits each communicating with a corresponding one of said receiver circuits for providing input signals thereto in response to said data signals, each of said automatic gain control circuits including,
(1) means for amplifying data signals applied to an input thereof and for providing the amplified data signals, as input signals, to a corresponding receiver circuit; and
(2) a voltage controllable resistance element having a linear resistance characteristic connected to the input of the amplifying means and responsive to said data signals and to the output control signal from a corresponding receiver circuit for controlling the resistance thereof to effect a linear attenuation in the amplitude of the data signals applied to the input of the amplifying means, regardless of the amplitude of any of the data signals, to maintain the amplitude of the input signals to a corresponding receiver circuit substantially constant to thereby substantially eliminate the frequency intermodulation products generated by the frequencies of the data signals of at least two channels from interfering with the frequencies of the data signals being received by all channels, whereby each automatic gain control circuit's corresponding receiver circuit receives only those input signals at the frequency to which it is tuned.

10. In a communication system of the type wherein data signals are frequency multiplexed over a common communication link as a plurality of discrete frequencies, with each frequency representing a channel for carrying data to be received, apparatus for substantially eliminating frequency intermodulation products in at least two channels from interfering with the frequency of another channel to ensure the reception of data signals by each of the channels comprising:
(a) a common signal source located at a prescribed location along said communication link, said signal source simultaneously transmitting, over said communication link, a plurality of discrete frequencies, with each frequency representing a separate frequency channel for carrying data;
(b) a plurality of receiver circuits, equal in number to the number of transmitted frequencies, located at prescribed intervals along said communication link, each tuned to a different frequency for receiving input signals corresponding to a one of the frequency channels, and each receiver circuit generating an output control signal having a magnitude which varies in accordance with the magnitude of the input signals correspondingly received thereby; and
(c) a plurality of automatic gain control circuits, equal in number to the number of said receiver circuits, with each being associated with a corresponding one of said receiver circuits and receiving, over said communication link, said data signals, whereby the amplitudes of at least two of the data signals received are much greater than the amplitudes of the other data signals, said automatic gain control circuits each communicating with a corresponding one of said receiver circuits for providing input signals thereto in response to said data signals, each of said automatic gain control circuits including,
(1) means for amplifying data signals applied to an input thereof, and for providing the amplified data signals, as input signals, to a corresponding receiver circuit, and
(2) a voltage controllable resistance element having a linear resistance characteristic connected to the input of the amplifying means and responsive to said data signals and to the control voltage from a corresponding receiver circuit for controlling the resistance thereof to effect a linear attenuation in the amplitude of the data signals applied to the input of the amplifying means, regardless of the amplitude of any of the data signals, to maintain the amplitude of the input signals to a corresponding receiver circuit substantially constant to thereby substantially eliminate the frequency intermodulation products generated by the frequencies of the data signals of at least two channels from interfering with the frequencies of the data signals being received by all channels, whereby each automatic gain control circuit's corresponding receiver circuit receives only those input signals at the frequency to which it is tuned.

* * * * *